United States Patent
Shibata

(10) Patent No.: US 10,544,945 B2
(45) Date of Patent: Jan. 28, 2020

(54) HEAT SUPPLY SYSTEM

(71) Applicant: Osaka Gas Co., Ltd., Osaka-shi (JP)

(72) Inventor: Yoshitaka Shibata, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 176 days.

(21) Appl. No.: 15/544,322

(22) PCT Filed: Nov. 20, 2015

(86) PCT No.: PCT/JP2015/082714
§ 371 (c)(1),
(2) Date: Jul. 18, 2017

(87) PCT Pub. No.: WO2016/117220
PCT Pub. Date: Jul. 28, 2016

(65) Prior Publication Data
US 2018/0010809 A1    Jan. 11, 2018

(30) Foreign Application Priority Data
Jan. 20, 2015 (JP) .................. 2015-008804

(51) Int. Cl.
*F24D 17/00* (2006.01)
*F24D 3/08* (2006.01)
(Continued)

(52) U.S. Cl.
CPC ......... *F24D 17/0036* (2013.01); *F24D 3/082* (2013.01); *F24D 17/001* (2013.01); *F24D 17/0057* (2013.01)

(58) Field of Classification Search
CPC .............. F24D 17/0036; F24D 17/001; F24D 17/0057; F24D 3/082; F24D 12/02;
(Continued)

(56) References Cited

U.S. PATENT DOCUMENTS 2,211,573 A * 8/1940 McGrath ............. F24D 19/1066
                                                     237/8 R
4,451,003 A * 5/1984 de Mena ................. F22B 33/18
                                                     122/448.1
(Continued)

FOREIGN PATENT DOCUMENTS

EP           1045127 A2    10/2000
JP        2002277053 A      9/2002
(Continued)

*Primary Examiner* — Gregory L Huson
*Assistant Examiner* — Daniel E Namay
(74) *Attorney, Agent, or Firm* — The Webb Law Firm

(57) ABSTRACT

A heat supply system with a first temperature detection unit that detects a first temperature of hot water in a tank and a second temperature detection unit that detects a second temperature above the first temperature detection unit. When the first temperature is a first lower limit temperature or less, where a temperature increase operation by a combined heat and power supply device is permitted, a control device operates the combined heat and power supply device and flow state adjustment devices such that a heat medium circulates between the combined heat, power supply device, and hot water storage device. When the second temperature is a second lower limit temperature or less, where a temperature increase operation by a boiler device is permitted, the control device operates the boiler device and the flow state adjustment devices such that the heat medium circulates between the boiler device and hot water storage device.

9 Claims, 3 Drawing Sheets

(51) Int. Cl.
   *F24D 12/02*  (2006.01)
   *F24D 19/10*  (2006.01)
   *F24H 1/00*   (2006.01)

(58) Field of Classification Search
   CPC ............. F24D 19/1066; F24D 2200/04; F24D 2200/26; F24D 2220/042; F02G 5/04; F24H 1/00
   USPC ............ 237/12.1, 19, 8 A, 2 A; 236/1 C, 14, 236/91 D
   See application file for complete search history.

(56) References Cited

U.S. PATENT DOCUMENTS

| | | | | |
|---|---|---|---|---|
| 4,754,607 A | * | 7/1988 | Mackay | F02C 6/18 237/12.1 |
| 5,020,721 A | * | 6/1991 | Horne | F24D 17/00 122/14.3 |
| 6,435,420 B1 | * | 8/2002 | Kasai | F02G 5/00 237/12.1 |
| 7,240,505 B2 | * | 7/2007 | Kim | F25B 13/00 62/238.7 |
| 8,479,689 B2 | * | 7/2013 | Pitonyak | F22B 35/008 122/448.3 |
| 8,843,238 B2 | * | 9/2014 | Wenzel | G05D 23/1923 700/277 |
| 9,130,910 B1 | * | 9/2015 | Logue | H04L 63/0428 |
| 2002/0108745 A1 | * | 8/2002 | Kimura | B60H 1/025 165/236 |
| 2004/0200905 A1 | * | 10/2004 | Saitoh | F24D 17/02 237/19 |
| 2006/0254294 A1 | * | 11/2006 | Shimamoto | F24F 3/065 62/238.7 |
| 2006/0283967 A1 | * | 12/2006 | Cho | F24F 3/1423 237/12.1 |
| 2007/0012418 A1 | * | 1/2007 | Cho | F25B 13/00 165/58 |
| 2007/0018009 A1 | * | 1/2007 | Choi | F25B 27/00 237/12 |
| 2007/0246555 A1 | * | 10/2007 | Nishimura | F24D 3/08 237/2 B |
| 2008/0022707 A1 | * | 1/2008 | Cho | F25B 13/00 62/238.1 |
| 2008/0022708 A1 | * | 1/2008 | Cho | F25B 13/00 62/238.7 |
| 2008/0023961 A1 | * | 1/2008 | Cho | F25B 27/02 290/2 |
| 2008/0061158 A1 | * | 3/2008 | Nakagawa | F24D 11/005 237/12.1 |
| 2009/0026281 A1 | * | 1/2009 | McGreevy | F24D 17/0005 237/19 |
| 2011/0046790 A1 | * | 2/2011 | Miller | F24F 11/77 700/276 |
| 2011/0118857 A1 | * | 5/2011 | Bodnar | G05B 13/026 700/47 |
| 2012/0067561 A1 | * | 3/2012 | Bergman | B60H 1/00657 165/257 |
| 2015/0134124 A1 | * | 5/2015 | Carter | G05D 23/1923 700/278 |
| 2015/0204577 A1 | | 7/2015 | Son et al. | |
| 2017/0003024 A1 | * | 1/2017 | Vendramini | F23N 5/203 |
| 2017/0268811 A1 | * | 9/2017 | Ochiai | F25B 41/062 |

FOREIGN PATENT DOCUMENTS

| | | |
|---|---|---|
| JP | 2013104596 A | 5/2013 |
| JP | 2013190189 A | 9/2013 |
| WO | 2014051268 A1 | 4/2014 |

* cited by examiner

HEAT SUPPLY SYSTEM

CROSS-REFERENCE TO RELATED APPLICATIONS

This application is the United States national phase of International Application No. PCT/JP2015/082714 filed Nov. 20, 2015, and claims priority to Japanese Patent Application No. 2015-008804 filed Jan. 20, 2015, the disclosures of which are hereby incorporated in their entirety by reference.

TECHNICAL FIELD

The present invention relates to a heat supply system that is provided with a plurality of heat source devices that heat a heat medium, the heat supply system supplying the heat medium to a plurality of heat utilization devices that utilize heat being held by the heat medium.

BACKGROUND ART

Conventionally, there are heat supply systems that allow a plurality of heat utilization devices, such as a hot water supply device or an indoor heating device, to utilize heat generated by a plurality of heat source devices. For example, in a heat supply system described in Patent Document 1 (JP 2013-104596A), warm water in which heat generated by a plurality of heat source devices, namely a heat pump and an external heat source, has been recovered is supplied to a plurality of heat utilization devices, namely a hot water storage tank and an indoor heating device, while flowing through a water circuit and warm water circuits.

In the heat supply system described in Patent Document 1, a priority rank when operating the heat pump and the external heat source is set in advance. Also, the heat pump and the external heat source are operated in the order of that priority rank according to a load state.

PRIOR ART DOCUMENTS

Patent Documents

Patent Document 1: JP 2013-104596A

DISCLOSURE OF THE INVENTION

Problem to be Solved by the Invention

In the heat supply system described in Patent Document 1, the plurality of heat source devices are not necessarily used differently based on specific states of the plurality of heat utilization devices. For example, in a case of increasing the temperature of hot water in the hot water storage tank, if there is only a small amount of high temperature hot water remaining in the hot water storage tank, the hot water in the hot water storage tank must be immediately heated, so it is preferable to operate a heat source device having a large heat output, even though energy efficiency is low. On the other hand, if there is a relatively large amount of high temperature hot water remaining in the hot water storage tank, it is acceptable to slowly increase the temperature of the hot water in the hot water storage tank over time, so it is preferable to operate a heat source device having high energy efficiency, even though the heat output is small.

In this way, in the heat supply system described in Patent Document 1, although there is an idea to set a priority rank for operation of the plurality of heat source devices, the plurality of heat source devices are not operated efficiently according to the specific state of the plurality of heat utilization devices, properties of the plurality of heat source devices, and the like.

The present invention has been made in view of the above problems, and it is an object thereof to provide a heat supply system in which it is possible to efficiently operate a plurality of heat source devices according to the state of a heat utilization device.

Means for Solving Problem

In a characteristic configuration of a heat supply system according to the present invention for attaining the above object, in a heat supply system having a plurality of heat source devices that heat a heat medium, the heat supply system supplying the heat medium to a plurality of heat utilization devices that use heat being held by the heat medium, the heat supply system includes:

a heat medium return path where the heat medium at a relatively low temperature after heat has been used by each of the plurality of heat utilization devices is caused to merge, and where that heat medium is supplied in parallel to each of the plurality of heat source devices; a heat medium outward path where the heat medium at a relatively high temperature after being heated by each of the plurality of heat source devices is caused to merge, and where that heat medium is supplied in parallel to each of the plurality of heat utilization devices; a flow state adjustment device that adjusts a flow state of the heat medium in the heat medium return path and the heat medium outward path; and a control device that controls operation of the plurality of heat source devices and the flow state adjustment device;

in which a first heat utilization device among the plurality of heat utilization devices is a hot water storage device having a tank that stores hot water, and the hot water storage device heats the hot water inside of the tank using heat held by the heat medium, a second heat utilization device among the plurality of heat utilization devices is an indoor heating device that performs indoor heating using heat held by the heat medium, a first heat source device among the plurality of heat source devices is a combined heat and power supply device that generates both heat and electricity, a second heat source device among the plurality of heat source devices is a boiler device that heats the heat medium with combustion heat generated by burning a fuel, a heat exchange unit is provided inside of the tank of the hot water storage device, and by the heat exchange unit exchanging heat between the hot water stored in the tank and the heat medium, the temperature of the hot water being stored inside of the tank is increased, a hot water discharge path that allows the hot water being stored inside of the tank of the hot water storage device to flow out of the tank is connected to an upper portion of the tank, and a water supply path that allows water to be replenished according to the outflow of the hot water from the hot water discharge path to flow into the tank of the hot water storage device is connected to a lower portion of the tank, a first temperature detection unit that detects the temperature of hot water being stored inside of the tank, and a second temperature detection unit that detects the temperature of hot water being stored inside of the tank above the location where the first temperature detection unit performs detection, are provided, when a first temperature of the hot water detected by the first temperature detection unit is a first lower limit temperature or less, where a temperature increase operation by the combined heat and power supply device is permitted, the control device operates the combined heat and power supply device, and operates the flow state adjustment device such that the heat medium circulates between the combined heat and power supply device and the hot water storage device through the heat medium return path and the heat medium outward path, when a second temperature of the hot water detected by the second temperature detection unit is a second lower limit temperature or less, where a temperature increase operation by the boiler device is permitted, the control device operates the boiler device, and operates the flow state adjustment device such that the heat medium circulates between the boiler device and the hot water storage device through the heat medium return path and the heat medium outward path, and the first lower limit temperature is a temperature that is the second lower limit temperature or more.

According to the above characteristic configuration, when hot water at a high temperature stored inside of the tank flows out from the hot water discharge path connected to the upper portion of the tank, water is replenished from the water supply path connected to the lower portion of the tank, so a state is formed in which hot water at a relatively low temperature exists in the lower portion of the tank, and hot water at a relatively high temperature exists in the upper portion of the tank. Also, the first temperature detected by the first temperature detection unit is the temperature of the hot water stored relatively lower inside of the tank than water of the second temperature detected by the second temperature detection unit. That is, a state as described above, in which hot water at a relatively low temperature exists in the lower portion of the tank and hot water at a relatively high temperature exists in the upper portion of the tank, appears first as a decrease in the temperature of the hot water at the temperature detection location of the first temperature detection unit, which is below the second temperature detection unit. In addition, the first lower limit temperature is a temperature that is the second lower limit temperature or more. As a result, considering that the temperature of the hot water being stored decreases from the high temperature side to the low temperature side, the first temperature reaches the first lower limit temperature or less before the second temperature reaches the second lower limit temperature or less. Also, a hot water temperature increase operation is started earlier for the combined heat and power supply device, which has high energy efficiency, than for the boiler device.

Furthermore, the heat medium return path and the heat medium outward path connecting the combined heat and power supply device, the boiler device, and the hot water storage device are configured such that the heat medium at a relatively low temperature after heat has been used by the hot water storage device is supplied in parallel to each of the combined heat and power supply device and the boiler device, and the heat medium at a relatively high temperature after heating by each of the combined heat and power supply device and the boiler device is supplied to the hot water storage device. That is, the heat medium heated by operation of the combined heat and power supply device is used for a temperature increase operation in the hot water storage device without passing through the boiler device, which is not operating. As a result, it is possible to perform a temperature increase operation in the hot water storage device while effectively utilizing heat generated by the combined heat and power supply device.

In addition, when the second temperature has reached the second lower limit temperature or less, the boiler device with a large heat output is operated in addition to the combined heat and power supply device to increase the temperature of the hot water.

Accordingly, it is possible to provide a heat supply system capable of efficiently operating a plurality of heat source devices according to the state of a heat utilization device.

In another characteristic configuration of a heat supply system according to the present invention, in a heat supply system having a plurality of heat source devices that heat a heat medium, the heat supply system supplying the heat medium to a plurality of heat utilization devices that use heat being held by the heat medium, the heat supply system includes:

a heat medium return path where the heat medium at a relatively low temperature after heat has been used by each of the plurality of heat utilization devices is caused to merge, and where that heat medium is supplied in parallel to each of the plurality of heat source devices; a heat medium outward path where the heat medium at a relatively high temperature after being heated by each of the plurality of heat source devices is caused to merge, and where that heat medium is supplied in parallel to each of the plurality of heat utilization devices; a flow state adjustment device that adjusts a flow state of the heat medium in the heat medium return path and the heat medium outward path; and a control device that controls operation of the plurality of heat source devices and the flow state adjustment device;

in which a first heat utilization device among the plurality of heat utilization devices is a hot water storage device having a tank that stores hot water, and the hot water storage device heats the hot water inside of the tank using heat held by the heat medium, a second heat utilization device among the plurality of heat utilization devices is an indoor heating device that performs indoor heating using heat held by the heat medium, a first heat source device among the plurality of heat source devices is a combined heat and power supply device that generates both heat and electricity, a second heat source device among the plurality of heat source devices is a boiler device that heats the heat medium with combustion heat generated by burning a fuel, a heat exchange unit is provided inside of the tank of the hot water storage device, and by the heat exchange unit exchanging heat between the hot water stored in the tank and the heat medium, the temperature of the hot water being stored inside of the tank is increased, a hot water discharge path that allows the hot water being stored inside of the tank of the hot water storage device to flow out of the tank is connected to an upper portion of the tank, and a water supply path that allows water to be replenished according to the outflow of the hot water from the hot water discharge path to flow into the tank of the hot water storage device is connected to a lower portion of the tank, a temperature detection unit that detects the temperature of hot water being stored inside of the tank is provided, when a first temperature of the hot water detected by the temperature detection unit is a first lower limit temperature or less, where a temperature increase operation by the combined heat and power supply device is permitted, the control device operates the combined heat and power supply device, and operates the flow state adjustment device such that the heat medium circulates between the combined heat and power supply device and the hot water storage device through the heat medium return path and the heat medium outward path, when a second temperature of the hot water detected by the temperature detection unit is a second lower limit temperature or less, where a temperature increase operation by the boiler device is permitted, the control device operates the boiler device, and operates the flow state adjustment device such that the heat medium circulates between the boiler device and the hot water storage device through the heat medium return path and the heat medium outward path, and the first lower limit temperature is a temperature higher than the second lower limit temperature.

According to the above characteristic configuration, when hot water at a high temperature stored inside of the tank flows out from the hot water discharge path connected to the upper portion of the tank, water is replenished from the water supply path connected to the lower portion of the tank, so a state is formed in which hot water at a relatively low temperature exists in the lower portion of the tank, and hot water at a relatively high temperature exists in the upper portion of the tank. The first lower limit temperature, which is a reference temperature at the time of starting operation of the combined heat and power supply device, is a temperature higher than the second lower limit temperature, which is a reference temperature at the time of starting operation of the boiler device. That is, the temperature of the hot water detected by the temperature detection unit reaches the first lower limit temperature or less earlier in time than the temperature of the hot water detected by the temperature detection unit reaches the second lower limit temperature or less. As a result, a temperature increase operation of the hot water is started earlier for the combined heat and power supply device, which has high energy efficiency, than for the boiler device.

Furthermore, the heat medium return path and the heat medium outward path connecting the combined heat and power supply device, the boiler device, and the hot water storage device are configured such that the heat medium at a relatively low temperature after heat has been used by the hot water storage device is supplied in parallel to each of the combined heat and power supply device and the boiler device, and the heat medium at a relatively high temperature after heating by each of the combined heat and power supply device and the boiler device is supplied to the hot water storage device. That is, the heat medium heated by operation of the combined heat and power supply device is used for a temperature increase operation in the hot water storage device without passing through the boiler device, which is not operating. As a result, it is possible to perform a temperature increase operation in the hot water storage device while effectively utilizing heat generated by the combined heat and power supply device.

In addition, when the temperature of the hot water detected by the temperature detection unit is the second lower limit temperature or less, the boiler device with a large heat output is operated in addition to the combined heat and power supply device to increase the temperature of the hot water.

Accordingly, it is possible to provide a heat supply system capable of efficiently operating a plurality of heat source devices according to the state of a heat utilization device.

In another characteristic configuration of a heat supply system according to the present invention, in one day, a temperature increase permitted time zone where a temperature increase operation of the hot water stored inside of the tank of the hot water storage device is permitted, and a temperature increase unpermitted time zone where a temperature increase operation is not permitted, are set, in one day, a boiler permitted time zone where operation of the boiler device is permitted, and a boiler unpermitted time zone where operation of the boiler device is not permitted, are set, in one day, a combined heat and power supply permitted time zone where operation of the combined heat and power supply device is permitted, and a combined heat and power supply unpermitted time zone where operation of the combined heat and power supply device is not permitted, are set, when the current time is in the temperature increase permitted time zone and the combined heat and power supply permitted time zone, and the first temperature is the first lower limit temperature or less, the control device operates the combined heat and power supply device, and operates the flow state adjustment device such that the heat medium circulates between the combined heat and power supply device and the hot water storage device through the heat medium return path and the heat medium outward path, thereby executing a temperature increase operation by the combined heat and power supply device, and when the current time is in the temperature increase permitted time zone and the boiler permitted time zone, and the second temperature is the second lower limit temperature or less, the control device operates the boiler device, and operates the flow state adjustment device such that the heat medium circulates between the boiler device and the hot water storage device through the heat medium return path and the heat medium outward path, thereby executing a temperature increase operation by the boiler device.

According to the above characteristic configuration, when the current time is in the temperature increase permitted time zone, in a case where the current time is in the combined heat and power supply permitted time zone and the first temperature is the first lower limit temperature or less, heat generated by the combined heat and power supply device can be utilized for a temperature increase operation of the hot water storage device, and in a case where the current time is in the boiler permitted time zone and the second temperature is the second lower limit temperature or less, heat generated by the boiler device can be utilized for a temperature increase operation of the hot water storage device. As a result, a temperature increase operation of the hot water storage device can be performed while effectively utilizing both heat generated by the combined heat and power supply device and heat generated by the boiler device.

In another characteristic configuration of a heat supply system according to the present invention, in the temperature increase permitted time zone, in one day there is at least one individual temperature increase time zone that is continuous in time, a partial time zone including the start time of one of the individual temperature increase time zones is set so as to overlap in time with the combined heat and power supply permitted time zone, and so as to not overlap in time with the boiler permitted time zone, and a time zone after the partial time zone is set so as to overlap in time with the combined heat and power supply permitted time zone and the boiler permitted time zone.

According to the above characteristic configuration, in a partial time zone including the start time of one of the individual temperature increase time zones, only heat generated by the combined heat and power supply device can be utilized in a temperature increase operation of the hot water storage device. In addition, after passage of that partial time zone, both the heat generated by the combined heat and power supply device and the heat generated by the boiler device can be utilized in a temperature increase operation of the hot water storage device. As a result, while utilizing the heat generated by the combined heat and power supply device in a temperature increase operation of the hot water storage device with priority given to the heat generated by the combined heat and power supply device, the heat generated by the boiler device can also be utilized in the temperature increase operation of the hot water storage device.

In another characteristic configuration of a heat supply system according to the present invention, in the temperature increase permitted time zone, in one day there is at least one individual temperature increase time zone that is continuous in time, and one of the individual temperature increase time zones is set so as to overlap in time with the combined heat and power supply permitted time zone, and so as to not overlap in time with the boiler permitted time zone.

According to the above characteristic configuration, in one individual temperature increase time zone, it is possible to perform a temperature increase operation of the hot water storage device with only the heat generated by the combined heat and power supply device.

In another characteristic configuration of a heat supply system according to the present invention, a room temperature detection unit that detects the temperature of air within a room to be heated by the indoor heating device is provided, in one day, an indoor heating permitted time zone where operation of the indoor heating device is permitted, and an indoor heating unpermitted time zone where operation of the indoor heating device is not permitted, are set, when the current time is in the indoor heating permitted time zone and the combined heat and power supply permitted time zone, and the temperature of the air detected by the room temperature detection unit is a third lower limit temperature or less, where an indoor heating operation using the combined heat and power supply device is permitted, the control device operates the combined heat and power supply device, and operates the flow state adjustment device such that the heat medium circulates between the combined heat and power supply device and the indoor heating device through the heat medium return path and the heat medium outward path, thereby executing an indoor heating operation using the combined heat and power supply device, when the current time is in the indoor heating permitted time zone and the boiler permitted time zone, and the temperature of the air detected by the room temperature detection unit is a fourth lower limit temperature or less, where an indoor heating operation using the boiler device is permitted, the control device operates the boiler device, and operates the flow state adjustment device such that the heat medium circulates between the boiler device and the indoor heating device through the heat medium return path and the heat medium outward path, thereby executing an indoor heating operation using the boiler device, and the third lower limit temperature is set to a temperature higher than the fourth lower limit temperature.

According to the above characteristic configuration, when the current time is in the indoor heating permitted time zone, in a case where the current time is in the combined heat and power supply permitted time zone and the temperature of the air to be heated is a third lower limit temperature or less, where an indoor heating operation using the combined heat and power supply device is permitted, heat generated by the combined heat and power supply device can be utilized for an indoor heating operation by the indoor heating device, and in a case where the current time is in the boiler permitted time zone and the temperature of the air to be heated is a fourth lower limit temperature or less, where an indoor heating operation using the boiler device is permitted, heat generated by the boiler device can be utilized for an indoor heating operation by the indoor heating device. As a result, an indoor heating operation by the indoor heating device can be performed while effectively utilizing both heat generated by the combined heat and power supply device and heat generated by the boiler device.

In addition, the third lower limit temperature is set to a temperature higher than the fourth lower limit temperature, so the temperature of the air detected by the room temperature detection unit reaches the third lower limit temperature before the temperature of the air detected by the room temperature detection unit reaches the fourth lower limit temperature. That is, even when the current time is in the indoor heating permitted time zone, the combined heat and power supply permitted time zone, and the boiler permitted time zone, that is, even when the combined heat and power supply device can be operated based on the value of the air temperature and the boiler device can be operated based on the value of the air temperature, the air temperature reaches the third lower limit temperature or less before the air temperature reaches the fourth lower limit temperature or less, so the combined heat and power supply device, which has high energy efficiency, is utilized first for indoor heating operation.

In another characteristic configuration of a heat supply system according to the present invention, while the control device is executing an indoor heating operation using the combined heat and power supply device, if the temperature of the air detected by the room temperature detection unit is a third upper limit temperature or more, where an indoor heating operation using the combined heat and power supply device is not permitted, the control device stops the combined heat and power supply device, while the control device is executing an indoor heating operation using the boiler device, if the temperature of the air detected by the room temperature detection unit is a fourth upper limit temperature or more, where an indoor heating operation using the boiler device is not permitted, the control device stops the boiler device, the third upper limit temperature is set to a temperature higher than the third lower limit temperature, the fourth upper limit temperature is set to a temperature higher than the fourth lower limit temperature, and the third upper limit temperature is set to a temperature higher than the fourth upper limit temperature.

According to the above characteristic configuration, the third upper limit temperature is set to a temperature higher than the fourth upper limit temperature, so the temperature of the air detected by the room temperature detection unit reaches the fourth upper limit temperature before the temperature of the air detected by the room temperature detection unit reaches the third upper limit temperature. That is, even if an indoor heating operation was executed utilizing both the combined heat and power supply device and the boiler device, the boiler device stops first. As a result, the combined heat and power supply device, which has high energy efficiency, is utilized for the indoor heating operation for a longer period.

In another characteristic configuration of a heat supply system according to the present invention, while the control device is executing a temperature increase operation by the combined heat and power supply device, if the first temperature is a first upper limit temperature or more, where a temperature increase operation by the combined heat and power supply device is not permitted, the control device stops the combined heat and power supply device, while the control device is executing a temperature increase operation by the boiler device, if the second temperature is a second upper limit temperature or more, where a temperature increase operation by the boiler device is not permitted, the control device stops the boiler device, the first upper limit temperature is set to a temperature higher than the first lower limit temperature, the second upper limit temperature is set to a temperature higher than the second lower limit temperature, and the first upper limit temperature is set to a temperature higher than the second upper limit temperature.

According to the above characteristic configuration, the first upper limit temperature is set to a temperature higher than the second upper limit temperature, so the second temperature can be expected to reach the second upper limit temperature before the first temperature reaches the first upper limit temperature. That is, even if a temperature increase operation was executed utilizing both the combined heat and power supply device and the boiler device, the boiler device can be expected to stop first. As a result, the combined heat and power supply device, which has high energy efficiency, is utilized for a temperature increase operation of the hot water for a longer period.

In another characteristic configuration of a heat supply system according to the present invention, a temperature difference between the first upper limit temperature and the first lower limit temperature is set smaller than a temperature difference between the second upper limit temperature and the second lower limit temperature.

According to the above characteristic configuration, by setting the first upper limit temperature, the first lower limit temperature, the second upper limit temperature, and the second lower limit temperature to the values as described above, operation of the combined heat and power supply device can be started at an early stage if the temperature of the hot water inside of the tank of the hot water storage device decreases slightly, this operation continues until the temperature of the hot water reaches a relatively high temperature, operation of the boiler device does not start until the temperature of the hot water inside of the tank decreases greatly, and this operation is stopped as soon as possible.

BEST MODE FOR CARRYING OUT THE INVENTION

First Embodiment

Following is a description of the configuration of a heat supply system of the present embodiment with reference to the drawings.

Figure 1:
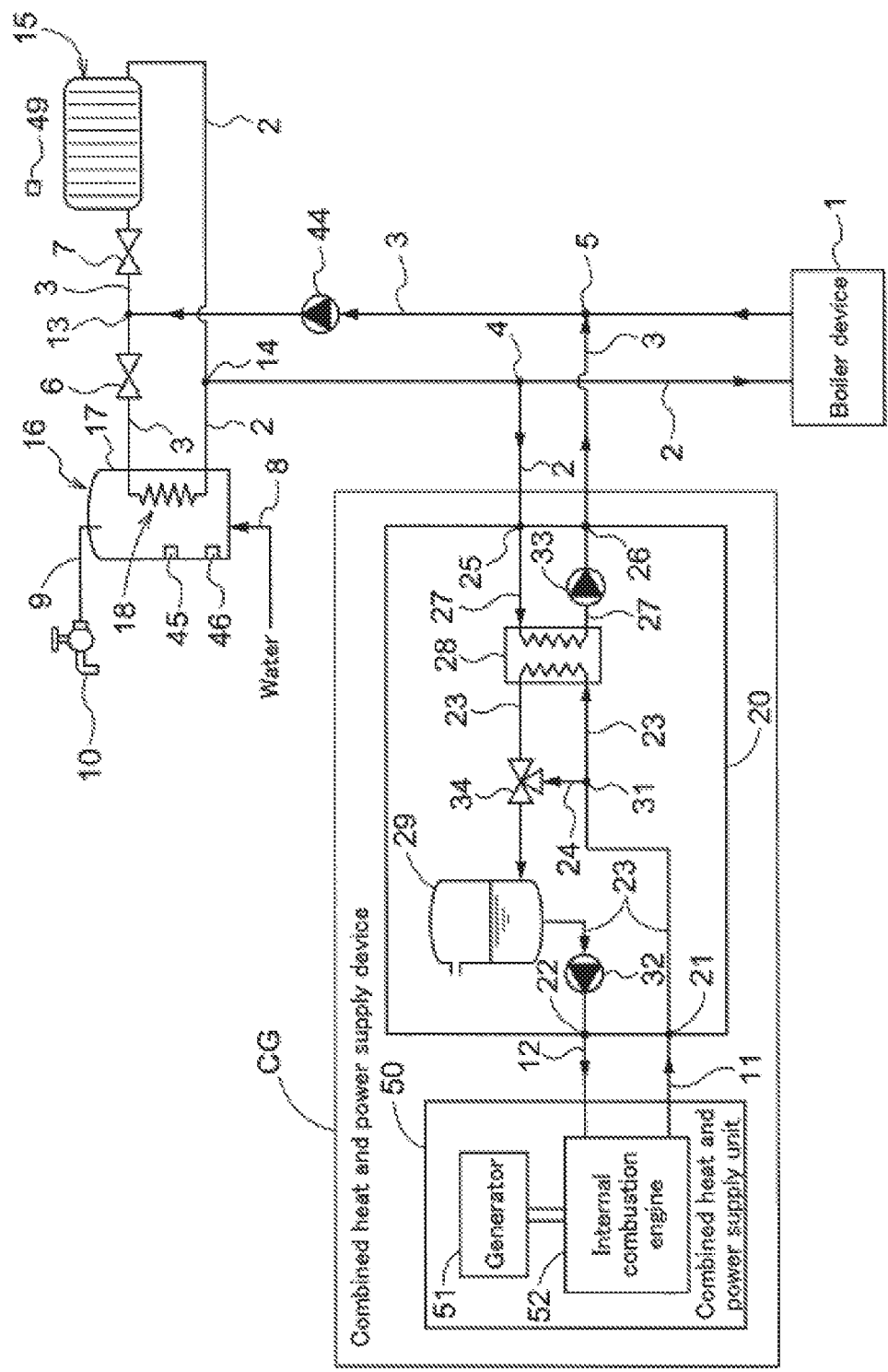
FIG. 1 shows a configuration of a heat supply system.

FIG. 1 shows the configuration of the heat supply system. As shown in the drawing, the heat supply system includes a plurality of heat source devices (a combined heat and power supply device CG and a boiler device 1), a second heat medium supply path 3 as a heat medium outward path, a second heat medium return path 2 as a heat medium return path, flow state adjustment devices (a circulation pump 44, a second pump 33, an opening/closing valve 6, and an opening/closing valve 7), and a control device C.

The combined heat and power supply device CG includes a combined heat and power supply unit 50 and a waste heat recovery unit 20.

The combined heat and power supply unit 50 is a device that generates both heat and electricity, and has an advantage of increasing energy efficiency. The combined heat and power supply unit 50 shown in FIG. 1 includes an internal combustion engine 52 and a generator 51 driven by the internal combustion engine 52. Therefore, in the combined heat and power supply unit 50, heat discharged from the engine and electricity output from the generator 51 are generated.

Note that the combined heat and power supply unit 50 may be configured in any manner as long as it is a device that can generate both heat and electricity. For example, a device having a fuel cell capable of generating heat and electricity, or the like, can be used as the combined heat and power supply unit 50. The control device C controls operation of the combined heat and power supply unit 50. Control of operation of the combined heat and power supply unit 50 is performed by the control device C, described later.

The boiler device 1 is a device that heats a heat medium by using combustion heat generated by burning fuel, and commonly has an advantage of having large heat output. Control of operation of the boiler device 1 is performed by the control device C, described later.

The waste heat recovery unit 20 performs heat exchange between a first heat medium that flows through a first heat medium flow path 23 and a second heat medium that flows through a second heat medium flow path 27 in a heat exchanger 28. The role of the waste heat recovery unit 20 is to recover heat generated by the combined heat and power supply unit 50 (that is, heat held by the first heat medium), and transfer that heat to the second heat medium.

The waste heat recovery unit 20 includes a first heat medium side inlet 21 where the first heat medium flows in, a first heat medium side outlet 22 where the first heat medium flows out, a first heat medium flow path 23 where the first heat medium flows from the first heat medium side inlet 21 to the first heat medium side outlet 22, a second heat medium side inlet 25 where the second heat medium flows in, a second heat medium side outlet 26 where the second heat medium flows out, a second heat medium flow path 27 where the second heat medium flows from the second heat medium side inlet 25 to the second heat medium side outlet 26, the heat exchanger 28 that exchanges heat between the first heat medium that flows through the first heat medium flow path 23 and the second heat medium that flows through the second heat medium flow path 27, an expansion tank 29 that absorbs volume changes of the first heat medium, a bypass flow path 24, and a mixer 34. Preferably, the waste heat recovery unit 20 is provided with an external container, and on a surface of the external container, has the first heat medium side inlet 21, the first heat medium side outlet 22, the second heat medium side inlet 25, and the second heat medium side outlet 26, and inside of the external container, has the first heat medium flow path 23, the second heat medium flow path 27, the heat exchanger 28, the expansion tank 29, the bypass flow path 24, and the mixer 34.

A first heat medium supply path 12 where the first heat medium is supplied from the waste heat recovery unit 20 to the combined heat and power supply unit 50 is connected to the first heat medium side outlet 22 of the waste heat recovery unit 20. A first heat medium return path 11 where the first heat medium is returned from the combined heat and power supply unit 50 toward the waste heat recovery unit 20 is connected to the first heat medium side inlet 21 of the waste heat recovery unit 20.

The first heat medium supplied to the combined heat and power supply unit 50 through the first heat medium supply path 12 is heated by heat discharged from the combined heat and power supply unit 50, and the heated first heat medium returns to the waste heat recovery unit 20 through the first heat medium return path 11.

The first heat medium that has flowed into the inside of the waste heat recovery unit 20 from the first heat medium side inlet 21 flows through the inside of the waste heat recovery unit 20 through the first heat medium flow path 23, and arrives at the first heat medium side outlet 22. The heat exchanger 28, the mixer 34, the expansion tank 29, and a first pump 32 are disposed in the first heat medium flow path 23 between the first heat medium side inlet 21 and arrival at the first heat medium side outlet 22.

The second heat medium that has flowed into the inside of the waste heat recovery unit 20 from the second heat medium side inlet 25 flows through the inside of the waste heat recovery unit 20 through the second heat medium flow path 27, and arrives at the second heat medium side outlet 26. The heat exchanger 28 and a second pump 33 are disposed in the second heat medium flow path 27 between the second heat medium side inlet 25 and arrival at the second heat medium side outlet 26.

Control of operation of the first pump 32 and the second pump 33 is performed by the control device C, described later.

The waste heat recovery unit 20 of the present embodiment includes a bypass flow path 24 that allows the first heat medium to flow so as to bypass the heat exchanger 28 in the first heat medium flow path 23, and the mixer 34, which adjusts the ratio between the flow rate of the first heat medium that flows through the bypass flow path 24 and the flow rate of the first heat medium that flows through the heat exchanger 28. Specifically, the bypass flow path 24 is branched from a branch portion 31 in the first heat medium flow path 23, and allows the first heat medium that flows through the first heat medium flow path 23 to bypass the heat exchanger 28 when flowing.

The second heat medium supply path 3, where the second heat medium at a relatively high temperature is supplied from the waste heat recovery unit 20 to a hot water storage device 16 and an indoor heating device 15, is connected to the second heat medium side outlet 26 of the waste heat recovery unit 20. The second heat medium return path 2, where the second heat medium at a relatively low temperature returns from the hot water storage device 16 and the indoor heating device 15 toward the waste heat recovery unit 20, is connected to the second heat medium side inlet 25 of the waste heat recovery unit 20.

The boiler device 1 is also connected to the second heat medium supply path 3 and the second heat medium return path 2. Specifically, the second heat medium branched at a branch portion 4 in the second heat medium return path 2 is supplied to each of the waste heat recovery unit 20 and the boiler device 1. From the waste heat recovery unit 20 and the boiler device 1, the second heat medium merges at a merging portion 5 in the second heat medium supply path 3. Then, the second heat medium is supplied through the second heat medium supply path 3 to the hot water storage device 16 and the indoor heating device 15, which utilize the heat being held by the second heat medium, and after the heat has been utilized by the hot water storage device 16 and the indoor heating device 15, the second heat medium is returned through the second heat medium return path 2. The circulation pump 44 is provided in the second heat medium supply path 3. Control of operation of the circulation pump 44 is performed by the control device C, described later.

In this manner, the waste heat recovery unit 20 and the boiler device 1 are provided parallel to the second heat medium supply path 3 and the second heat medium return path 2. That is, the heat generated by the combined heat and power supply unit 50 is transferred to the second heat medium through the waste heat recovery unit 20, and that heat is supplied to the hot water storage device 16 and the indoor heating device 15 without passing through the boiler device 1. Similarly, the heat generated by the boiler device 1 is transferred to the second heat medium, and that heat is supplied to the hot water storage device 16 and the indoor heating device 15 without passing through the waste heat recovery unit 20. Then, the second heat medium having a relatively low temperature supplied from the hot water storage device 16 and the indoor heating device 15 flows into the waste heat recovery unit 20 and the boiler device 1, and the second heat medium at a low temperature is heated in the waste heat recovery unit 20 and the boiler device 1, so the second heat medium can recover a large amount of heat from the waste heat recovery unit 20 and the boiler device 1.

The mixer 34 of the present embodiment is provided at the location where the bypass flow path 24 and the first heat medium flow path 23 merge, and is configured to adjust the ratio of the flow rate of the first heat medium that flows through the bypass flow path 24 and the flow rate of the first heat medium that flows through the heat exchanger 28 so as to mix these flows together. In the present embodiment, a temperature-sensitive three-way valve is used as the mixer 34. In other words, the mixer 34, by detecting the temperature of the first heat medium after merging and adjusting the opening/closing state of the flow path, operates automatically to adjust the ratio of the flow rate of the first heat medium that flows through the bypass flow path 24 and the flow rate of the first heat medium that flows through the heat exchanger 28 such that the temperature of the first heat medium after merging approaches a predetermined temperature.

For example, at the start of operation of the combined heat and power supply unit 50, the temperature of the first heat medium supplied from the combined heat and power supply unit 50 to the first heat medium side inlet 21 is low, so the temperature of the first heat medium after mixing by the mixer 34 is low. At this time, in the mixer 34, most of the first heat medium is caused to flow through a high temperature side (the bypass flow path 24 side). The temperature of the first heat medium supplied from the combined heat and power supply unit 50 to the first heat medium side inlet 21 increases, and when the temperature of the first heat medium after mixing by the mixer 34 approaches the predetermined temperature, the mixer 34 gradually increases the flow rate of the first heat medium that flows through a low temperature side (the heat exchanger 28 side), and decreases the flow rate of the first heat medium that flows through the high temperature side (the bypass flow path 24 side). Afterward, when the temperature of the first heat medium after mixing by the mixer 34 exceeds the predetermined temperature, the mixer 34 increases the low temperature side (the heat exchanger 28 side) in order to lower the temperature.

In this way, in the mixer 34, instead of changing the flow rate of the first heat medium of only any one of the high temperature side (the bypass flow path 24 side) and the low temperature side (the heat exchanger 28 side), by changing both flow rates, the ratio of the flow rate of the first heat medium that flows through the high temperature side (the bypass flow path 24 side) and the flow rate of the first heat medium that flows through the low temperature side (the heat exchanger 28 side) are changed, and thus the mixer 34 automatically operates so that the temperature of the first heat medium after merging approaches the predetermined temperature. As a result, the temperature of the first heat medium that flows out from the waste heat recovery unit 20 and is supplied to the combined heat and power supply unit 50 approaches the predetermined temperature. Then, the first heat medium (cooling water) in an appropriate temperature range near the predetermined temperature is continuously supplied to the internal combustion engine 52 of the combined heat and power supply unit 50.

In addition, as the mixer 34, a temperature-sensitive three-way valve capable of manual setting and changing of the predetermined temperature can be used. In this way, when the mixer 34 is configured using a temperature-sensitive three-way valve configured such that the predetermined temperature is variable, the temperature of the first heat medium that flows out from the mixer 34, that is, the temperature of the first heat medium that flows out from the first heat medium side outlet 22 of the waste heat recovery unit 20, can be changed. In other words, it is possible to change the temperature of the first heat medium that flows out from the waste heat recovery unit 20 and is supplied to the combined heat and power supply unit 50. Therefore, even if the heat source device used in combination with the waste heat recovery unit 20 is changed and so the temperature of the first heat medium (that is, the temperature of the cooling water) required by the heat source device is changed, by changing the predetermined temperature, it is possible to supply the first heat medium at a temperature close to the temperature required by the heat source device from the waste heat recovery unit 20 to the heat source device.

In the present embodiment, the hot water storage device 16 has a tank 17 that stores hot water and a heat exchange unit 18. A hot water discharge path 9 that allows hot water stored in the tank 17 to flow to the outside of the tank 17 is connected to an upper portion of the tank 17. A water supply path 8 that allows water replenished according to the outflow of hot water from the hot water discharge path 9 to flow into the tank 17 is connected to a lower portion of the tank 17. Water pressure is constantly applied to the hot water within the tank 17 from the water supply path 8. A hot water supply terminal 10 such as a faucet is connected to an end portion of the hot water discharge path 9. When the hot water supply terminal 10 is opened, the hot water inside of the tank 17 is delivered to the hot water supply terminal 10 through the hot water discharge path 9 by the water pressure being applied inside of the tank 17.

The second heat medium flows through the heat exchange unit 18. In the heat exchange unit 18, heat exchange is performed between the hot water stored in the tank 17 and the second heat medium. That is, in the heat exchange unit 18, heating and temperature increase of the hot water inside of the tank 17 is performed using the heat held by the second heat medium.

As described above, the tank 17 is configured so that at the same time as hot water is withdrawn from the hot water discharge path 9 connected to the upper portion, water is replenished from the water supply path 8 connected to the lower portion, so hot water at a relatively low temperature exists in the vicinity of the connection location of the water supply path 8. Also, hot water at a relatively high temperature is stored above the hot water at a relatively low temperature.

The tank 17 is provided with a temperature sensor that detects the temperature of the stored hot water. In the present embodiment, a plurality of temperature sensors are provided in the tank 17, and these temperature sensors include a first temperature sensor 46 serving as a first temperature detection unit that detects the temperature of the hot water stored in the tank 17, and a second temperature sensor 45 serving as a second temperature detection unit that detects the temperature of the hot water stored in the tank 17 above the location measured by the first temperature sensor 46. Therefore, the first temperature of the hot water measured by the first temperature sensor 46 is the temperature of the hot water stored relatively lower inside the tank 17 of the hot water storage device 16 than the hot water of the second temperature measured by the second temperature sensor 45. The measurement results of the first temperature sensor 46 and the second temperature sensor 45 are transmitted to the control device C, described later. These temperature sensors 45 and 46 can be realized using, for example, a thermocouple, a thermistor, or the like.

Regarding the hot water storage device 16, in one day, a temperature increase permitted time zone where a temperature increase operation of the hot water stored inside of the tank 17 of the hot water storage device 16 is permitted, and a temperature increase unpermitted time zone where a temperature increase operation is not permitted, are set, and for example, this setting information is stored in a storage device 47. The temperature increase permitted time zone and the temperature increase unpermitted time zone are items of information input by a user or the like of the heat supply system using an input device 48, or information determined in advance with respect to the hot water storage device 16.

The indoor heating device 15 is a device that performs indoor heating using the heat being held by the second heat medium. More specifically, the indoor heating device 15 heats a room by exchanging heat between the second heat medium and air within the room, that is, by causing the second heat medium to radiate heat. A room temperature sensor 49 serving as a room temperature detection unit that detects the temperature of air within the room to be heated by the indoor heating device 15 is provided in the room. Measurement results of the room temperature sensor 49 are transmitted to the control device C, described later. The room temperature sensor 49 can be realized using, for example, a thermocouple, a thermistor, or the like.

Regarding the indoor heating device 15, in one day, an indoor heating permitted time zone where operation of the indoor heating device 15 is permitted, and an indoor heating unpermitted time zone where operation is not permitted, are set, and for example, this setting information is stored in the storage device 47. The indoor heating permitted time zone and the indoor heating unpermitted time zone are items of information input by a user or the like of the heat supply system using the input device 48, or information determined in advance with respect to the indoor heating device 15.

The second heat medium supply path 3 is branched at a branch portion 13, and the second heat medium is supplied in parallel to the hot water storage device 16 and the indoor heating device 15. That is, the second heat medium at the same temperature is supplied to the hot water storage device 16 and the indoor heating device 15. In the second heat medium supply path 3 between the branch portion 13 and the hot water storage device 16, the opening/closing valve 6 that opens/closes that flow path is provided. In the second heat medium supply path 3 between the branch portion 13 and the indoor heating device 15, the opening/closing valve 7 that opens/closes that flow path is provided.

The second heat medium return path 2 where the second heat medium flows after the heat has been used in the hot water storage device 16, and the second heat medium return path 2 where the second heat medium flows after the heat has been used in the indoor heating device 15, merge together at a merging portion 14. Control of operation of the opening/closing valve 6 and the opening/closing valve 7 is performed by the control device C, described later.

As described above, the flow state of the second heat medium in the second heat medium supply path 3 and the second heat medium return path 2 is adjusted by the circulation pump 44, the second pump 33, the opening/closing valve 6, and the opening/closing valve 7. The circulation pump 44, the second pump 33, the opening/closing valve 6 and the opening/closing valve 7 function as flow state adjustment devices that adjust the flow state of the second heat medium in the second heat medium supply path 3 and the second heat medium return path 2.

Figure 2:
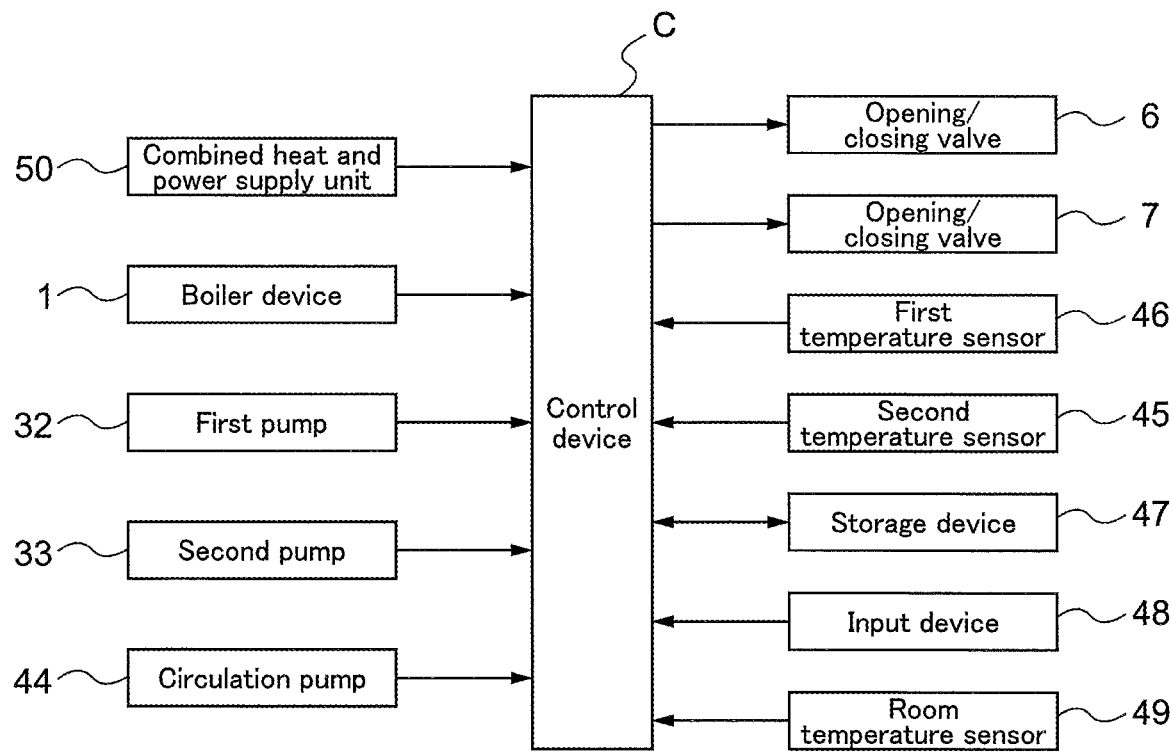
FIG. 2 is a functional block diagram of the heat supply system.

FIG. 2 is a control block diagram of the heat supply system. As described above, the control device C that controls operation of the heat supply system controls operation of the combined heat and power supply unit 50, the boiler device 1, the first pump 32, the second pump 33, the circulation pump 44, the opening/closing valve 6, the opening/closing valve 7, and the like. Also, the measurement results of the first temperature sensor 46, the measurement results of the second temperature sensor 45, the measurement results of the room temperature sensor 49, and the like are transmitted to the control device C. Information input by the input device 48 is also transmitted to the control device C. Information handled by the control device C, such as these items of information transmitted to the control device C, can be stored in the storage device 47.

Figure 3:
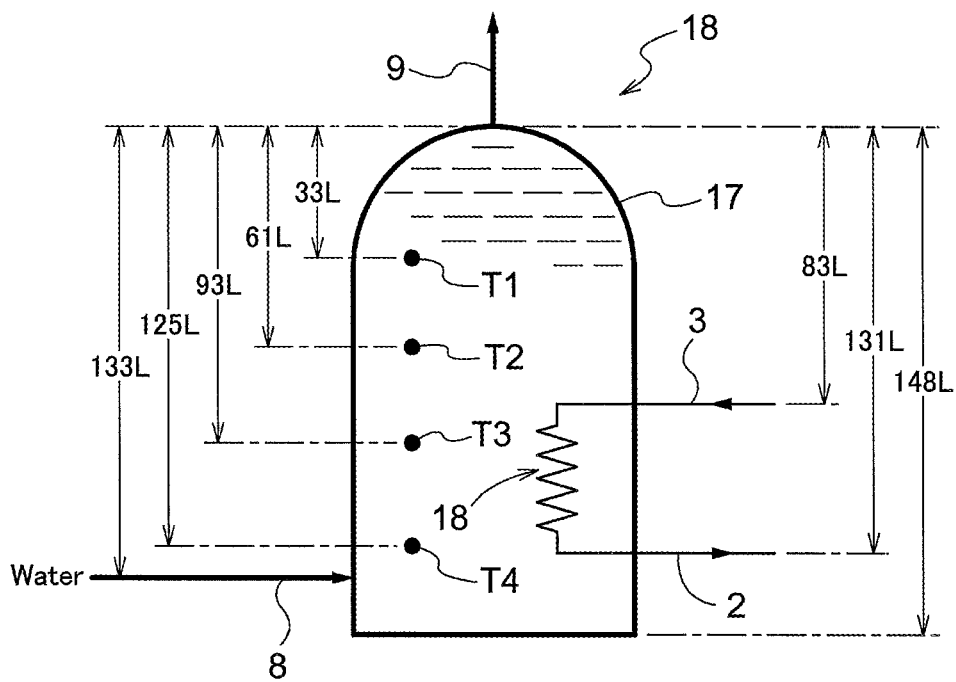
FIG. 3 shows an exemplary structure of a tank used to explain temperature changes of hot water.
Figure 4:
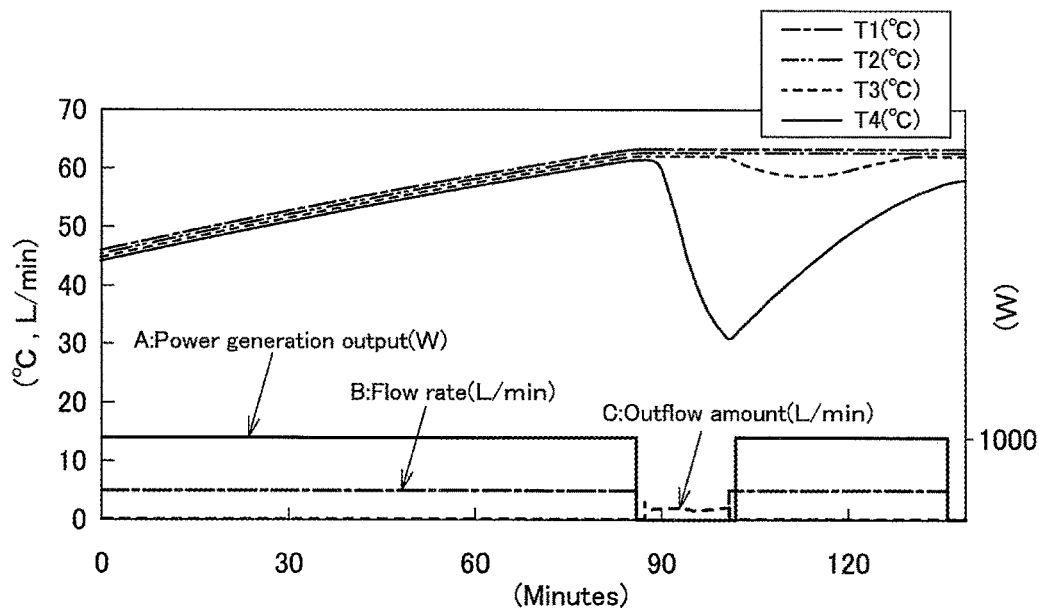
FIG. 4 is a graph showing temperature changes of hot water within the tank.

FIG. 3 illustrates temperature changes of hot water in a tank of a hot water storage device. Specifically, FIG. 3 shows an exemplary structure of the tank 17 used to describe temperature changes of the hot water, and FIG. 4 is a graph showing temperature changes of the hot water inside of the tank 17.

As shown in FIG. 3, the volume of the tank 17 used is 148 L (liters). The hot water discharge path 9 is connected to a top portion of the tank 17. The water supply path 8 is connected to a side portion of the tank 17, at a position where the volume from the top portion of the tank 17 is 133 L. Temperature sensors T1, T2, T3, and T4 are provided at the side portion of the tank 17. The temperature sensor T1 is provided at a position where the volume from the top portion of the tank 17 is 33 L. The temperature sensor T2 is provided at a position where the volume from the top portion of the tank 17 is 61 L. The temperature sensor T3 is provided at a position where the volume from the top portion of the tank 17 is 93 L. The temperature sensor T4 is provided at a position where the volume from the top portion of the tank 17 is 125 L.

Also, the tank 17 is provided with the heat exchange unit 18 that performs heat exchange between the hot water and the second heat medium. The second heat medium flows into the heat exchange unit 18 through the second heat medium supply path 3, and the second heat medium flows out from the heat exchange unit 18 through the second heat medium return path 2. The second heat medium supply path 3 is connected at a position where the volume from the top portion of the tank 17 is 83 L. The second heat medium return path 2 is connected at a position where the volume from the top portion of the tank 17 is 131 L.

Temperature changes of the hot water inside of the tank 17 were measured using the tank 17 having the above sort of structure.

FIG. 4 shows changes over time of temperatures (° C.) of hot water measured by each of the temperature sensors T1, T2, T3, and T4, changes over time of the flow rate per unit time (L/min) of the second heat medium in the heat exchange unit 18 (indicated as "B: flow rate" in the figure), changes over time of the outflow amount (L/min) of hot water from the hot water discharge path 9 (indicated as "C: outflow amount" in the figure), and changes over time of power generation output (W) of the combined heat and power supply unit 50 (indicated as "A: power generation output" in the figure). When the combined heat and power supply unit 50 is operating, the waste heat recovery unit 20 recovers heat generated by the combined heat and power supply unit 50 using the first heat medium, and transfers the recovered heat to the second heat medium, so in FIG. 4, while the combined heat and power supply unit 50 (the combined heat and power supply device CG) is operating and the flow rate of the second heat medium in the heat exchange unit 18 is greater than zero, the heat generated by the combined heat and power supply unit 50 is transferred to the hot water inside of the tank 17.

In a more specific description of FIG. 4, at a point in time of 0 minutes, the combined heat and power supply unit 50 operates in a state where the power generation output is 1000 (W) and the second heat medium flows in the heat exchange unit 18, and according to this flow, the hot water inside of the tank 17 is heated by the heat generated by the combined heat and power supply unit 50. As a result, as indicated by the measurement results of the temperature sensors T1, T2, T3, and T4, the temperature of the entirety of hot water inside of the tank 17 increases. Thereafter, operation of the combined heat and power supply unit 50 is stopped at a time of about 86 minutes, and the flow rate of the second heat medium that flows through the heat exchange unit 18 also becomes zero. At this point in time, the temperature of the hot water measured by the temperature sensors T1, T2, T3, and T4 is about 63° C. for each sensor.

Next, when the outflow of hot water from the hot water discharge path 9 is started at a time of about 87 minutes, this is accompanied by water flowing into the tank 17 from the water supply path 8. Therefore, the temperature of the hot water measured by the temperature sensor T4 at the position closest to the water supply path 8 sharply drops. However, a large change is not seen in the temperature of the hot water measured by the temperature sensors T1, T2, and T3 located above the temperature sensor T4. That is, it is clear that a state of temperature layering has formed inside of the tank 17. Thereafter, the temperature of the hot water measured by the temperature sensor T3 starts to decrease, but when operation of the combined heat and power supply unit 50 is restarted at a time of about 102 minutes and the second heat medium at a high temperature starts flowing in the heat exchange unit 18, the temperature of the hot water measured by the temperature sensors T3 and T4 starts to increase.

It is clear that, in this way, in the tank 17 of the hot water storage device 16, even if water flows in from the water supply path 8 accompanying outflow of hot water from the hot water discharge path 9, in the upper portion, the hot water at a high temperature forms a temperature layer while retaining that temperature, and only the temperature of the hot water in the lower portion decreases. Also, when the hot water is again heated by the heat exchange unit 18, the temperature of the low temperature hot water in the lower portion is selectively increased while maintaining the temperature layer.

Figure 5:
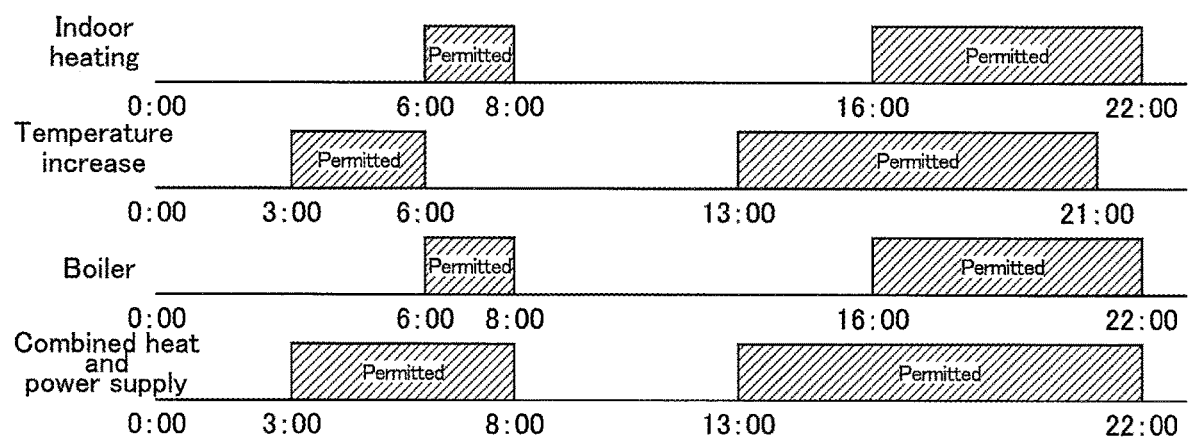
FIG. 5 illustrates operation modes of the heat supply system.

Next is a description of the timing of operating the combined heat and power supply unit 50 and the waste heat recovery unit 20, and the timing of operating the boiler device. FIG. 5 illustrates operation modes of the heat supply system.

Regarding the indoor heating device 15 described as performing "indoor heating" in the figure, in one day, an indoor heating permitted time zone where operation of the indoor heating device 15 is permitted, and an indoor heating unpermitted time zone where operation is not permitted and that is other than the indoor heating permitted time zone, are set, and for example, this setting information is stored in the storage device 47. The indoor heating permitted time zone and the indoor heating unpermitted time zone are items of information input by a user or the like of the heat supply system using the input device 48, or information determined in advance with respect to the indoor heating device 15.

In the example shown in FIG. 5, two hours between the time 6:00 and the time 8:00, and six hours from the time 16:00 to the time 22:00 are the indoor heating permitted time zone, and the other time zones are the indoor heating unpermitted time zone.

Regarding the hot water storage device 16 described as performing "temperature increase" in the figure, in one day, a temperature increase permitted time zone where a temperature increase operation of the hot water stored inside of the tank 17 of the hot water storage device 16 is permitted, and a temperature increase unpermitted time zone where a temperature increase operation is not permitted, are set, and for example, this setting information is stored in the storage device 47. The temperature increase permitted time zone and the temperature increase unpermitted time zone are items of information input by a user or the like of the heat supply system using the input device 48, or information determined in advance with respect to the hot water storage device 16.

In the example shown in FIG. 5, three hours between the time 3:00 and the time 6:00, and eight hours from the time 13:00 to the time 21:00 are the temperature increase permitted time zone, and the other time zones are the temperature increase unpermitted time zone.

Regarding the boiler device 1 described as "boiler" in the figure, in one day, a boiler permitted time zone where operation of the boiler device 1 is permitted, and a boiler unpermitted time zone where operation of the boiler device 1 is not permitted, are set, and for example, this setting information is stored in the storage device 47. The boiler permitted time zone and the boiler unpermitted time zone are items of information input by a user or the like of the heat supply system using the input device 48, or information determined in advance with respect to the boiler device 1.

In the example shown in FIG. 5, two hours between the time 6:00 and the time 8:00, and six hours from the time 16:00 to the time 22:00 are the boiler permitted time zone, and the other time zones are the boiler unpermitted time zone.

Regarding the combined heat and power supply device CG described as performing "combined heat and power supply" in the figure, in one day, a combined heat and power supply permitted time zone where operation of the combined heat and power supply device CG is permitted, and a combined heat and power supply unpermitted time zone where operation of the combined heat and power supply device CG is not permitted, are set, and for example, this setting information is stored in the storage device 47. The combined heat and power supply permitted time zone and the combined heat and power supply unpermitted time zone are items of information input by a user or the like of the heat supply system using the input device 48, or information determined in advance with respect to the combined heat and power supply device CG.

In the example shown in FIG. 5, five hours between the time 3:00 and the time 8:00, and nine hours from the time 13:00 to the time 22:00 are the combined heat and power supply permitted time zone, and the other time zones are the combined heat and power supply unpermitted time zone.

Hot Water Storage Device 16

In the heat supply system of the present embodiment, it is possible to increase the temperature of the hot water stored in the hot water storage device 16 with the heat generated by the combined heat and power supply device CG. In this case, when a first temperature of the hot water measured by the first temperature sensor 46 is a first lower limit temperature or less, where a temperature increase operation by the combined heat and power supply device CG is permitted, the control device C operates the combined heat and power supply device CG, and operates the flow state adjustment devices (the circulation pump 44, the second pump 33, the opening/closing valve 6, and the opening/closing valve 7) such that the heat medium circulates between the combined heat and power supply device CG and the hot water storage device 16 through the second heat medium supply path 3 and the second heat medium return path 2. Specifically, in the present embodiment, when the current time is in the temperature increase permitted time zone and the combined heat and power supply permitted time zone, and the first temperature (the temperature of the hot water measured by the first temperature sensor 46) of the hot water inside of the tank 17 of the hot water storage device 16 to be heated is the first lower limit temperature or less, where a temperature increase operation by the combined heat and power supply device CG is permitted, the control device C operates the combined heat and power supply device CG, and operates the flow state adjustment devices such that the heat medium circulates between the combined heat and power supply device CG and the hot water storage device 16 through the second heat medium supply path 3 and the second heat medium return path 2, thereby executing a temperature increase operation by the combined heat and power supply device CG. That is, the control device C operates the internal combustion engine 52 and the generator 51 included in the combined heat and power supply device CG, operates the first pump 32 and the second pump 33 included in the waste heat recovery unit 20, operates the circulation pump 44, and opens the opening/closing valve 6. As a result, the heat generated by the combined heat and power supply unit 50 is transferred to the first heat medium, and the heat held by the first heat medium is transferred to the second heat medium. In addition, the second heat medium passes through the second heat medium supply path 3 and is supplied to the heat exchange unit 18 of the hot water storage device 16, and thus the temperature of the hot water inside of the tank 17 is increased.

Note that even when the current time is in the temperature increase permitted time zone and the combined heat and power supply permitted time zone, if the first temperature of the hot water measured with the first temperature sensor 46 is higher than the first lower limit temperature, that is, if hot water that is still at a sufficiently high temperature is stored in the tank 17 of the hot water storage device 16, the control device C does not operate the combined heat and power supply unit 50 and the waste heat recovery unit 20. Also, even if the first temperature of the hot water measured with the first temperature sensor 46 is the first lower limit temperature or less, that is, even if the temperature of the hot water stored in the tank 17 of the hot water storage device 16 is low, if the current time is not in a time zone that overlaps the temperature increase permitted time zone and the combined heat and power supply permitted time zone (if the current time is in the temperature increase unpermitted time zone or the combined heat and power supply unpermitted time zone), the control device C does not operate the combined heat and power supply unit 50 and the waste heat recovery unit 20.

In the heat supply system of the present embodiment, it is possible to increase the temperature of the hot water stored in the hot water storage device 16 with the heat generated by the boiler device 1. In this case, when a second temperature of the hot water measured by the second temperature sensor 45 is a second lower limit temperature or less, where a temperature increase operation by the boiler device 1 is permitted, the control device C operates the boiler device 1, and operates the flow state adjustment devices (the circulation pump 44, the second pump 33, the opening/closing valve 6, and the opening/closing valve 7) such that the heat medium circulates between the boiler device 1 and the hot water storage device 16 through the second heat medium supply path 3 and the second heat medium return path 2. Specifically, in the present embodiment, when the current time is in the temperature increase permitted time zone and the boiler permitted time zone, and the second temperature (the temperature of the hot water measured by the second temperature sensor 45) of the hot water inside of the tank 17 of the hot water storage device 16 to be heated is the second lower limit temperature or less, where a temperature increase operation by the boiler device 1 is permitted, the control device C operates the boiler device 1, and operates the flow state adjustment devices such that the heat medium circulates between the boiler device 1 and the hot water storage device 16 through the second heat medium supply path 3 and the second heat medium return path 2, thereby executing a temperature increase operation by the boiler device 1. That is, the control device C operates the boiler device 1, operates the circulation pump 44, and opens the opening/closing valve 6. As a result, the heat generated by the boiler device 1 is transferred to the second heat medium. In addition, the second heat medium passes through the second heat medium supply path 3 and is supplied to the heat exchange unit 18 of the hot water storage device 16, and thus the temperature of the hot water inside of the tank 17 is increased.

Note that even when the current time is in the temperature increase permitted time zone and the boiler permitted time zone, if the second temperature of the hot water measured with the second temperature sensor 45 is higher than the second lower limit temperature, that is, if hot water that is still at a sufficiently high temperature is stored in the tank 17 of the hot water storage device 16, the control device C does not operate the boiler device 1. Also, even if the second temperature of the hot water measured with the second temperature sensor 45 is the second lower limit temperature or less, that is, even if the temperature of the hot water stored in the tank 17 of the hot water storage device 16 is low, if the current time is not in a time zone that overlaps the temperature increase permitted time zone and the boiler permitted time zone (if the current time is in the temperature increase unpermitted time zone or the boiler unpermitted time zone), the control device C does not operate the boiler device 1.

The above first temperature measured by the first temperature sensor 46 is the temperature of the hot water stored relatively lower inside the tank 17 than the hot water of the second temperature measured by the second temperature sensor 45. That is, relatively low temperature hot water exists in the lower portion of the tank 17 as described above, and a state in which relatively high temperature hot water exists in the upper portion of the tank 17 appears first as a temperature decrease of the hot water at the temperature detection location of the first temperature sensor 46, which is lower than the second temperature sensor 45. In addition, the first lower limit temperature is a temperature that is the second lower limit temperature or more, and for example, the first lower limit temperature is 55° C. and the second lower limit temperature is 30° C. Considering that the temperature of the hot water stored in the tank 17 decreases from the high temperature side to the low temperature side, before the second temperature becomes 30° C. (the second lower limit temperature) or less, the first temperature is 55° C. (the first lower limit temperature) or less. That is, even when the current time is in the temperature increase permitted time zone, the combined heat and power supply permitted time zone, and the boiler permitted time zone, that is, even when the combined heat and power supply device CG can be operated based on the value of the first temperature and the boiler device 1 can be operated based on the value of the second temperature, the first temperature becomes the first lower limit temperature or less before the second temperature becomes the second lower limit temperature or less, so operation is started first for the combined heat and power supply device CG.

In addition, even when the current time is in the temperature increase permitted time zone and the combined heat and power supply permitted time zone, while the control device C is executing a temperature increase operation by the combined heat and power supply device CG, if the first temperature of the hot water stored inside of the tank 17 of the hot water storage device 16 becomes a first upper limit temperature or more (for example, 60° C. or more), where a temperature increase operation by the combined heat and power supply device CG is not permitted, the control device C stops the combined heat and power supply device CG. In this regard, a configuration may be adopted in which the control device C, when stopping the combined heat and power supply device CG, operates the flow state adjustment devices (the circulation pump 44, the second pump 33, the opening/closing valve 6, and the opening/closing valve 7) such that the heat medium does not circulate between the combined heat and power supply device CG and the hot water storage device 16, or operates the flow state adjustment devices (the circulation pump 44, the second pump 33, the opening/closing valve 6, and the opening/closing valve 7) such that the heat medium continuously circulates between the combined heat and power supply device CG and the hot water storage device 16.

Also, even when the current time is in the temperature increase permitted time zone and the boiler permitted time zone, while the control device C is executing a temperature increase operation by the boiler device 1, if the second temperature of the hot water stored inside of the tank 17 of the hot water storage device 16 becomes a second upper limit temperature or more (for example, 45° C. or more), where a temperature increase operation by the boiler device 1 is not permitted, the control device C stops the boiler device 1. In this regard, a configuration may be adopted in which the control device C, when stopping the boiler device 1, operates the flow state adjustment devices such that the heat medium does not circulate between the boiler device 1 and the hot water storage device 16, or operates the flow state adjustment devices such that the heat medium continuously circulates between the boiler device 1 and the hot water storage device 16.

In the present embodiment, as described above, the first upper limit temperature (60° C.) is set to a higher temperature than the first lower limit temperature (55° C.), the second upper limit temperature (45° C.) is set to a higher temperature than the second lower limit temperature (30° C.), and the first upper limit temperature (60° C.) is set to a higher temperature than the second upper limit temperature (45° C.). In this way, since the first upper limit temperature is set to a higher temperature than the second upper limit temperature, the second temperature can be expected to reach the second upper limit temperature before the first temperature reaches the first upper limit temperature. That is, even if both the combined heat and power supply device CG and the boiler device 1 are operated to increase temperature, the boiler device 1 can be expected to stop first.

As a result, the combined heat and power supply device CG, which has high energy efficiency, is utilized for a temperature increase operation of the hot water for a longer period.

As described above, in the temperature increase permitted time zone, in one day there is at least one individual temperature increase time zone that is continuous in time. In the example shown in FIG. 5, two individual temperature increase time zones are set in one day, with one individual temperature increase time zone being three hours from the time 3:00 to the time 6:00, and another individual temperature increase time zone being eight hours from the time 13:00 to the time 21:00.

Also, the individual temperature increase time zone from the time 3:00 to the time 6:00 overlaps in time with the combined heat and power supply permitted time zone, and is set so as to not overlap in time with the boiler permitted time zone. As a result, in the individual temperature increase time zone from the time 3:00 to the time 6:00, a temperature increase operation of the hot water storage device 16 can only be performed with the heat generated by the combined heat and power supply device CG. That is, it is possible to lengthen the operation time of the combined heat and power supply device CG.

Also, in the individual temperature increase time zone from the time 13:00 to the time 21:00, a partial time zone (from the time 13:00 to the time 16:00) including the start time of that zone overlaps in time with the combined heat and power supply permitted time zone, and is set so as to not overlap in time with the boiler permitted time zone. Also, a time zone (from the time 16:00 to the time 21:00) after that partial time zone is set so as to overlap in time with the combined heat and power supply permitted time zone and the boiler permitted time zone. As a result, in the partial time zone (from the time 13:00 to the time 16:00) including the start time, at first only the heat generated by the combined heat and power supply device CG can be used in the temperature increase operation of the hot water storage device 16. In addition, in the time zone (from the time 16:00 to the time 21:00) after that partial time zone, both the heat generated by the combined heat and power supply device CG and the heat generated by the boiler device 1 can be used in the temperature increase operation of the hot water storage device 16. As a result, while utilizing the heat generated by the combined heat and power supply device CG in the temperature increase operation of the hot water storage device 16 with time priority given to the heat generated by the combined heat and power supply device CG, the heat generated by the boiler device 1 can also be utilized in the temperature increase operation of the hot water storage device 16.

Indoor Heating Device 15

In the heat supply system of the present embodiment, a temperature increase of the air inside a building B can be performed by the indoor heating device 15 utilizing the heat generated by the combined heat and power supply device CG. In this case, when the current time is in the indoor heating permitted time zone and the combined heat and power supply permitted time zone, and the temperature of the air to be heated (the temperature of the air measured by the room temperature sensor 49) satisfies a temperature condition where an indoor heating operation by the indoor heating device 15 is permitted, that is, the air temperature is a third lower limit temperature (for example, such as 22° C.) or less, where an indoor heating operation utilizing the combined heat and power supply device CG is permitted, the control device C operates the combined heat and power supply device CG, and operates the flow state adjustment devices (the circulation pump 44, the second pump 33, the opening/closing valve 6, and the opening/closing valve 7) such that the heat medium circulates between the combined heat and power supply device CG and the indoor heating device 15 through the second heat medium supply path 3 and the second heat medium return path 2, thereby executing an indoor heating operation using the combined heat and power supply device CG. That is, the control device C operates the internal combustion engine 52 and the generator 51 included in the combined heat and power supply unit 50, operates the first pump 32 and the second pump 33 included in the waste heat recovery unit 20, operates the circulation pump 44, and opens the opening/closing valve 7. As a result, the heat generated by the combined heat and power supply unit 50 is transferred to the first heat medium, and further, the heat held by the first heat medium is transferred to the second heat medium. In addition, the second heat medium passes through the second heat medium supply path 3 and is supplied to the indoor heating device 15, and thus heat radiation of the second heat medium by the indoor heating device 15 (indoor heating) is performed.

Note that, even when the current time is in the indoor heating permitted time zone and the combined heat and power supply permitted time zone, while the control device C is executing an indoor heating operation utilizing the combined heat and power supply device CG, if the temperature of the air measured by the room temperature sensor 49 satisfies a temperature condition where an indoor heating operation utilizing the combined heat and power supply device CG is not permitted, that is, the air temperature becomes a third upper limit temperature (for example, such as 24° C.) or more, where an indoor heating operation utilizing the combined heat and power supply device CG is not permitted, the control device C stops the combined heat and power supply device CG. Thus, operation of the indoor heating device 15 is substantially stopped. In this regard, a configuration may be adopted in which the control device C, when stopping the combined heat and power supply device CG, operates the flow state adjustment devices such that the heat medium does not circulate between the combined heat and power supply device CG and the indoor heating device 15, or operates the flow state adjustment devices such that the heat medium continuously circulates between the combined heat and power supply device CG and the indoor heating device 15.

Also, even when the temperature of the air measured by the room temperature sensor 49 satisfies the temperature condition, that is, even when the room temperature is low, if the current time is not in a time zone that overlaps the indoor heating permitted time zone and the combined heat and power supply permitted time zone (if the current time is in the indoor heating unpermitted time zone or the combined heat and power supply unpermitted time zone), the control device C does not operate the indoor heating device 15.

In the heat supply system of the present embodiment, a temperature increase of the air inside the building B can be performed by the indoor heating device 15 using the heat generated by the boiler device 1. In this case, when the current time is in the indoor heating permitted time zone and the boiler permitted time zone, and the temperature of the air to be heated (the temperature of the air measured by the room temperature sensor 49) satisfies a temperature condition where an indoor heating operation by the indoor heating device 15 is permitted, that is, the air temperature is a fourth lower limit temperature (for example, such as 20° C.) or less, where an indoor heating operation utilizing the boiler device 1 is permitted, the control device C operates the boiler device 1, and operates the flow state adjustment devices (the circulation pump 44, the second pump 33, the opening/closing valve 6, and the opening/closing valve 7) such that the heat medium circulates between the boiler device 1 and the indoor heating device 15 through the second heat medium supply path 3 and the second heat medium return path 2, thereby executing an indoor heating operation using the boiler device 1. That is, the control device C operates the boiler device 1, operates the circulation pump 44, and opens the opening/closing valve 7. As a result, the heat generated by the boiler device 1 is transferred to the second heat medium. In addition, the second heat medium passes through the second heat medium supply path 3 and is supplied to the indoor heating device 15, and thus heat radiation of the second heat medium by the indoor heating device 15 (indoor heating) is performed.

In addition, in the present embodiment, the third lower limit temperature (22° C.) is set to a higher temperature than the fourth lower limit temperature (20° C.). That is, even when the current time is in the indoor heating permitted time zone, the combined heat and power supply permitted time zone, and the boiler permitted time zone, that is, even when the combined heat and power supply device CG can be operated based on the value of the air temperature and the boiler device 1 can be operated based on the value of the air temperature, the air temperature reaches the third lower limit temperature or less before the air temperature reaches the fourth lower limit temperature or less, so the combined heat and power supply device CG is utilized first for indoor heating operation.

Note that even when the current time is in the indoor heating permitted time zone and the boiler permitted time zone, if the temperature of the air measured by the room temperature sensor 49 does not satisfy the temperature condition (that is, when the air temperature is higher than the fourth lower limit temperature), that is, when the room temperature is sufficiently high, the control device C does not operate the indoor heating device 15.

Also, even when the temperature of the air measured by the room temperature sensor 49 satisfies the temperature condition, that is, even when the room temperature is low, if the current time is not in a time zone that overlaps the indoor heating permitted time zone and the boiler permitted time zone (if the current time is in the indoor heating unpermitted time zone or the boiler unpermitted time zone), the control device C does not operate the indoor heating device 15.

Note that, even when the current time is in the indoor heating permitted time zone and the boiler permitted time zone, while the control device C is executing an indoor heating operation utilizing the boiler device 1, if the temperature of the air measured by the room temperature sensor 49 satisfies a temperature condition where an indoor heating operation utilizing the boiler device 1 is not permitted, that is, the air temperature becomes a fourth upper limit temperature (for example, such as 21° C.) or more, where an indoor heating operation utilizing the boiler device 1 is not permitted, the control device C stops the boiler device 1. Thus, operation of the indoor heating device 15 is substantially stopped. In this regard, a configuration may be adopted in which the control device C, when stopping the boiler device 1, operates the flow state adjustment devices such that the heat medium does not circulate between the boiler device 1 and the indoor heating device 15, or operates the flow state adjustment devices such that the heat medium continuously circulates between the boiler device 1 and the indoor heating device 15.

Also, in the present embodiment, the third upper limit temperature (24° C.) is set to a higher temperature than the third lower limit temperature (22° C.), the fourth upper limit temperature (21° C.) is set to a higher temperature than the fourth lower limit temperature (20° C.), and the third upper limit temperature (24° C.) is set to a temperature of the fourth upper limit temperature (21° C.) or more. As a result, the temperature of the air detected by the room temperature sensor reaches the fourth upper limit temperature before the temperature of the air detected by the room temperature sensor reaches the third upper limit temperature. That is, even if an indoor heating operation was executed utilizing both the combined heat and power supply device CG and the boiler device 1, the boiler device 1 stops first. As a result, the combined heat and power supply device CG, which has high energy efficiency, is utilized for the indoor heating operation for a longer period.

As described above, in the indoor heating permitted time zone, there is at least one individual indoor heating time zone that is continuous in time in one day. In the example shown in FIG. 5, two individual indoor heating time zones are set in one day, with one individual indoor heating time zone being two hours from the time 6:00 to the time 8:00, and another individual indoor heating time zone being six hours from the time 16:00 to the time 22:00.

Also, the individual indoor heating time zone from the time 6:00 to the time 8:00, and the individual indoor heating time zone from the time 16:00 to the time 22:00, are both set to overlap in time with a combined heat and power supply permitted time zone and a boiler permitted time zone. As a result, both the heat generated by the combined heat and power supply device CG and the heat generated by the boiler device 1 can be utilized in the indoor heating operation of the indoor heating device 15.

Note that the second heat medium supply path 3 and the second heat medium return path 2 are shared by the boiler device 1 and the combined heat and power supply device CG, and the indoor heating device 15 and the hot water storage device 16, so when indoor heating operation of the indoor heating device 15 by the boiler device 1 and hot water storage operation of the hot water storage device 16 by the combined heat and power supply device CG are performed in the same time zone, hot water storage operation of the hot water storage device 16 by the boiler device 1 and indoor heating operation of the indoor heating device 15 by the combined heat and power supply device CG are performed unintentionally. However, in the present embodiment, as shown in FIG. 5, the time zone from the time 6:00 to the time 8:00, in which indoor heating operation of the indoor heating device 15 by the boiler device 1 can be performed, is set so as to not overlap in time with the time zone from the time 3:00 to the time 6:00, in which hot water storage operation of the hot water storage device 16 by the combined heat and power supply device CG can be performed. As a result, when indoor heating operation of the indoor heating device 15 and hot water storage operation of the hot water storage device 16 by the combined heat and power supply device CG are performed unintentionally, it is possible to avoid performing hot water storage operation of the hot water storage device 16 by the boiler device 1 or indoor heating operation of the indoor heating device 15 by the combined heat and power supply device CG.

Second Embodiment

A heat supply system of a second embodiment differs from the above-described embodiment in that operation control of the combined heat and power supply device CG and operation control of the boiler device 1 are performed using one temperature sensor. Following is a description of the heat supply system of the second embodiment, but a description of the same configurations as in the above embodiment will be omitted here.

In the heat supply system according to the first embodiment, operation control of the combined heat and power supply device CG and operation control of the boiler device 1 are performed using a plurality of temperature sensors (the first temperature sensor 46 and the second temperature sensor 45), but in the present embodiment, operation control of the combined heat and power supply device CG and operation control of the boiler device 1 are performed using one temperature sensor. Specifically, any one of the first temperature sensor 46 and the second temperature sensor 45 described above is used.

An example in which the first temperature sensor 46 is used as a temperature sensor that measures the temperature of hot water stored in a tank will be described below. However, the second temperature sensor 45 may also be used as a temperature sensor that measures the temperature of hot water stored in a tank.

In this case, when the first temperature of the hot water measured by the first temperature sensor 46 is the first lower limit temperature or less, where a temperature increase operation by the combined heat and power supply device CG is permitted, the control device C operates the combined heat and power supply device CG, and operates the flow state adjustment devices (the circulation pump 44, the second pump 33, the opening/closing valve 6, and the opening/closing valve 7) such that the heat medium circulates between the combined heat and power supply device CG and the hot water storage device 16 through the second heat medium supply path 3 and the second heat medium return path 2, and also, when the second temperature of the hot water measured by the first temperature sensor 46 is the second lower limit temperature or less, where a temperature increase operation by the boiler device 1 is permitted, the control device C operates the boiler device 1, and operates the flow state adjustment devices such that the heat medium circulates between the boiler device 1 and the hot water storage device 16 through the second heat medium supply path 3 and the second heat medium return path 2.

However, in the present embodiment, the first lower limit temperature is a temperature higher than the second lower limit temperature. For example, the first lower limit temperature is a temperature such as 55° C., and the second lower limit temperature is a temperature such as 30° C.

As also described in the above embodiment, when hot water at a high temperature stored inside of the tank 17 flows out from the hot water discharge path 9 connected to the upper portion of the tank 17, water is replenished from the water supply path 8 connected to the lower portion of the tank 17, so a state is formed in which hot water at a relatively low temperature exists in the lower portion of the tank 17, and hot water at a relatively high temperature exists in the upper portion of the tank 17. Also, in the present embodiment, the first lower limit temperature, which is a reference temperature at the time of starting operation of the combined heat and power supply device CG, is a temperature higher than the second lower limit temperature, which is a reference temperature at the time of starting operation of the boiler device 1. That is, the temperature of the hot water measured by the first temperature sensor 46 reaches the first lower limit temperature or less earlier in time than the temperature of the hot water measured by the first temperature sensor 46 reaches the second lower limit temperature or less. As a result, a temperature increase operation of the hot water is started earlier for the combined heat and power supply device CG, which has high energy efficiency, than for the boiler device 1. In addition, afterward, when the temperature of the hot water measured by the first temperature sensor 46 reaches the second lower limit temperature or less, the boiler device 1 with a large heat output is operated in addition to the combined heat and power supply device CG to increase the temperature of the hot water.

In addition, while the control device C is executing a temperature increase operation by the combined heat and power supply device CG, if the temperature of the hot water measured by the first temperature sensor 46 (the first temperature) becomes the first upper limit temperature or more (for example, 60° C. or more), where a temperature increase operation by the combined heat and power supply device CG is not permitted, the control device C stops the combined heat and power supply device CG. In this regard, a configuration may be adopted in which the control device C, when stopping the combined heat and power supply device CG, operates the flow state adjustment devices (the circulation pump 44, the second pump 33, the opening/closing valve 6, and the opening/closing valve 7) such that the heat medium does not circulate between the combined heat and power supply device CG and the hot water storage device 16, or operates the flow state adjustment devices such that the heat medium continuously circulates between the combined heat and power supply device CG and the hot water storage device 16.

Also, while the control device C is executing a temperature increase operation by the boiler device 1, if the temperature of the hot water measured by the first temperature sensor 46 (the second temperature) becomes the second upper limit temperature or more (for example, 45° C. or more), where a temperature increase operation by the boiler device 1 is not permitted, the control device C stops the boiler device 1. In this regard, a configuration may be adopted in which the control device C, when stopping the boiler device 1, operates the flow state adjustment devices such that the heat medium does not circulate between the boiler device 1 and the hot water storage device 16, or operates the flow state adjustment devices such that the heat medium continuously circulates between the boiler device 1 and the hot water storage device 16.

In this way, in the present embodiment as well, the first upper limit temperature (60° C.) is set to a higher temperature than the first lower limit temperature (55° C.), the second upper limit temperature (45° C.) is set to a higher temperature than the second lower limit temperature (30° C.), the first lower limit temperature (55° C.) is set to a higher temperature than the second lower limit temperature (30° C.), and the first upper limit temperature (60° C.) is set to a higher temperature than the second upper limit temperature (45° C.).

When the control device C performs operation control of the combined heat and power supply device CG and operation control of the boiler device 1 using the detection results of one temperature sensor (the first temperature sensor 46), a temperature difference (5° C.) is provided between the first upper limit temperature (60° C.) and the first lower limit temperature (55° C.), and a temperature difference (15° C.) is provided between the second upper limit temperature (45° C.) and the second lower limit temperature (30° C.). That is, the temperature difference (5° C.) between the first upper limit temperature and the first lower limit temperature is set smaller than the temperature difference (15° C.) between the second upper limit temperature (45° C.) and the second lower limit temperature (30° C.).

By setting the first upper limit temperature, the first lower limit temperature, the second upper limit temperature, and the second lower limit temperature to the values as described above, operation of the combined heat and power supply device CG can be started at an early stage if the temperature of the hot water inside of the tank 17 of the hot water storage device 16 decreases slightly, this operation continues until the temperature of the hot water reaches a relatively high temperature, operation of the boiler device 1 does not start until the temperature of the hot water inside of the tank 17 decreases greatly, and this operation is stopped as soon as possible.

Other Embodiments

In the above embodiments, a heat supply system was described using specific examples, but these configurations can be appropriately changed.

For example, in the description of the above embodiments, specific numerical values are given for the first lower limit temperature, the first upper limit temperature, the second lower limit temperature, the second lower limit temperature, and the like, but the above numerical values are given only by way of example, and can be appropriately changed.

In the above embodiments, the first temperature sensor (the first temperature detection unit) 46, the second temperature sensor (the second temperature detection unit) 45, the room temperature sensor (the room temperature detection unit) 49, and the like may also be realized with a thermostat. For example, the first temperature detection unit, which is a thermostat, is set so as to mechanically switch to an on state when detecting that the temperature of the hot water stored in the tank 17 is the first lower limit temperature or less, and mechanically switch to an off state when detecting that the water temperature is higher than the first lower limit temperature. By adopting such a configuration, the control device C can know that the first temperature detection unit, which is a thermostat, has detected that the temperature of the hot water has become the first lower limit temperature or less. It is also possible to adopt a configuration in which a threshold temperature (for example, such as the above-described first lower limit temperature) where the thermostat switches between the on state and the off state can be changed using a manual dial or the like.

In the above embodiments, the mixer 34 may be configured using an electronically controlled three-way mixing valve with valve opening/closing adjustment controlled according to a temperature detected by a temperature sensor (not shown), for example, or the mixer 34 may be configured using a plurality of such electronically controlled two-way valves.

Note that the configurations disclosed in the above embodiments (including the 'other embodiments', and also applying hereinafter) can be applied in combination with configurations disclosed in another embodiment, as long as there is no contradiction, and furthermore, the embodiments disclosed in the present specification are merely examples, and embodiments of the present invention are not limited to these, and can be appropriately modified within a scope not departing from the object of the present invention.

INDUSTRIAL APPLICABILITY

The present invention can be utilized in a heat supply system capable of efficiently operating a plurality of heat source devices according to the state of a heat utilization device.

DESCRIPTION OF REFERENCE SIGNS

1 boiler device (heat source device)
2 (heat medium return path)
3 second heat medium supply path (heat medium outward path)
6 opening/closing valve (flow state adjustment device)
7 opening/closing valve (flow state adjustment device)
11 first heat medium return path
12 first heat medium supply path
15 indoor heating device (heat utilization device)
16 hot water storage device (heat utilization device)
17 tank
32 first pump
33 second pump (flow state adjustment device)
44 circulation pump (flow state adjustment device)
45 second temperature sensor
46 first temperature sensor
49 room temperature sensor
C control device
CG combined heat and power supply device (heat source device)

The invention claimed is:

1. A heat supply system having a plurality of heat source devices that heat a heat medium, the heat supply system supplying the heat medium to a plurality of heat utilization devices that use heat being held by the heat medium,
wherein a first heat utilization device among the plurality of heat utilization devices is a hot water storage device having a tank that stores hot water, and the hot water storage device heats the hot water inside of the tank using heat held by the heat medium,
a second heat utilization device among the plurality of heat utilization devices is an indoor heating device that performs indoor heating using heat held by the heat medium, a first heat source device among the plurality of heat source devices is a combined heat and power supply device that generates both heat and electricity, a second heat source device among the plurality of heat source devices is a boiler device that heats the heat medium with combustion heat generated by burning a fuel, the heat supply system comprising:

a heat medium return path where the heat medium at a relatively low temperature after heat has been used by each of the hot water storage device and the indoor heating device is caused to merge, and where that heat medium is supplied in parallel to each of the combined heat and power supply device and the boiler device; a heat medium outward path where the heat medium at a relatively high temperature after being heated by each of the combined heat and power supply device and the boiler device is caused to merge, and where that heat medium is supplied in parallel to each of the hot water storage device and the indoor heating device; a flow state adjustment device that adjusts a flow state of the heat medium in the heat medium return path and the heat medium outward path; and a control device that controls operation of the plurality of heat source devices and the flow state adjustment device;

a heat exchange unit is provided inside of the tank of the hot water storage device, and by the heat exchange unit exchanging heat between the hot water stored in the tank and the heat medium, the temperature of the hot water being stored inside of the tank is increased, a hot water discharge path that allows the hot water being stored inside of the tank of the hot water storage device to flow out of the tank is connected to an upper portion of the tank, and a water supply path that allows water to be replenished according to the outflow of the hot water from the hot water discharge path to flow into the tank of the hot water storage device is connected to a lower portion of the tank, a first temperature detection unit that detects the temperature of hot water being stored inside of the tank, and a second temperature detection unit that detects the temperature of hot water being stored inside of the tank above the location where the first temperature detection unit performs detection, are provided, when a first temperature of the hot water detected by the first temperature detection unit is a first lower limit temperature or less, where a temperature increase operation by the combined heat and power supply device is permitted, the control device operates the combined heat and power supply device, and operates the flow state adjustment device such that the heat medium circulates between the combined heat and power supply device and the hot water storage device through the heat medium return path and the heat medium outward path, when a second temperature of the hot water detected by the second temperature detection unit is a second lower limit temperature or less, where a temperature increase operation by the boiler device is permitted, the control device operates the boiler device, and operates the flow state adjustment device such that the heat medium circulates between the boiler device and the hot water storage device through the heat medium return path and the heat medium outward path, and the first lower limit temperature is a temperature that is the second lower limit temperature or more.

2. The heat supply system according to claim 1, wherein in one day, a temperature increase permitted time zone where a temperature increase operation of the hot water stored inside of the tank of the hot water storage device is permitted, and a temperature increase unpermitted time zone where a temperature increase operation is not permitted, are set, in one day, a boiler permitted time zone where operation of the boiler device is permitted, and a boiler unpermitted time zone where operation of the boiler device is not permitted, are set, in one day, a combined heat and power supply permitted time zone where operation of the combined heat and power supply device is permitted, and a combined heat and power supply unpermitted time zone where operation of the combined heat and power supply device is not permitted, are set, when the current time is in the temperature increase permitted time zone and the combined heat and power supply permitted time zone, and the first temperature is the first lower limit temperature or less, the control device operates the combined heat and power supply device, and operates the flow state adjustment device such that the heat medium circulates between the combined heat and power supply device and the hot water storage device through the heat medium return path and the heat medium outward path, thereby executing a temperature increase operation by the combined heat and power supply device, and when the current time is in the temperature increase permitted time zone and the boiler permitted time zone, and the second temperature is the second lower limit temperature or less, the control device operates the boiler device, and operates the flow state adjustment device such that the heat medium circulates between the boiler device and the hot water storage device through the heat medium return path and the heat medium outward path, thereby executing a temperature increase operation by the boiler device.

3. The heat supply system according to claim 2, wherein in the temperature increase permitted time zone, in one day there is at least one individual temperature increase time zone that is continuous in time, a partial time zone including the start time of one of the individual temperature increase time zones is set so as to overlap in time with the combined heat and power supply permitted time zone, and so as to not overlap in time with the boiler permitted time zone, and a time zone after the partial time zone is set so as to overlap in time with the combined heat and power supply permitted time zone and the boiler permitted time zone.

4. The heat supply system according to claim 2, wherein in the temperature increase permitted time zone, in one day there is at least one individual temperature increase time zone that is continuous in time, and one of the individual temperature increase time zones is set so as to overlap in time with the combined heat and power supply permitted time zone, and so as to not overlap in time with the boiler permitted time zone.

5. The heat supply system according to claim 2, wherein a room temperature detection unit that detects the temperature of air within a room to be heated by the indoor heating device is provided, in one day, an indoor heating permitted time zone where operation of the indoor heating device is permitted, and an indoor heating unpermitted time zone where operation of the indoor heating device is not permitted, are set, when the current time is in the indoor heating permitted time zone and the combined heat and power supply permitted time zone, and the temperature of the air detected by the room temperature detection unit is a third lower limit temperature or less, where an indoor heating operation using the combined heat and power supply device is permitted, the control device operates the combined heat and power supply device, and operates the flow state adjustment device such that the heat medium circulates between the combined heat and power supply device and the indoor heating device through the heat medium return path and the heat medium outward path, thereby executing an indoor heating operation using the combined heat and power supply device, when the current time is in the indoor heating permitted time zone and the boiler permitted time zone, and the temperature of the air detected by the room temperature detection unit is a fourth lower limit temperature or less, where an indoor heating operation using the boiler device is permitted, the control device operates the boiler device, and operates the flow state adjustment device such that the heat medium circulates between the boiler device and the indoor heating device through the heat medium return path and the heat medium outward path, thereby executing an indoor heating operation using the boiler device, and the third lower limit temperature is set to a temperature higher than the fourth lower limit temperature.

6. The heat supply system according to claim 5, wherein while the control device is executing an indoor heating operation using the combined heat and power supply device, if the temperature of the air detected by the room temperature detection unit is a third upper limit temperature or more, where an indoor heating operation using the combined heat and power supply device is not permitted, the control device stops the combined heat and power supply device, while the control device is executing an indoor heating operation using the boiler device, if the temperature of the air detected by the room temperature detection unit is a fourth upper limit temperature or more, where an indoor heating operation using the boiler device is not permitted, the control device stops the boiler device, the third upper limit temperature is set to a temperature higher than the third lower limit temperature, the fourth upper limit temperature is set to a temperature higher than the fourth lower limit temperature, and the third upper limit temperature is set to a temperature higher than the fourth upper limit temperature.

7. The heat supply system according to claim 1, wherein while the control device is executing a temperature increase operation by the combined heat and power supply device, if the first temperature is a first upper limit temperature or more, where a temperature increase operation by the combined heat and power supply device is not permitted, the control device stops the combined heat and power supply device, while the control device is executing a temperature increase operation by the boiler device, if the second temperature is a second upper limit temperature or more, where a temperature increase operation by the boiler device is not permitted, the control device stops the boiler device, the first upper limit temperature is set to a temperature higher than the first lower limit temperature, the second upper limit temperature is set to a temperature higher than the second lower limit temperature, and the first upper limit temperature is set to a temperature higher than the second upper limit temperature.

8. The heat supply system according to claim 7, wherein a temperature difference between the first upper limit temperature and the first lower limit temperature is set smaller than a temperature difference between the second upper limit temperature and the second lower limit temperature.

9. A heat supply system having a plurality of heat source devices that heat a heat medium, the heat supply system supplying the heat medium to a plurality of heat utilization devices that use heat being held by the heat medium, wherein a first heat utilization device among the plurality of heat utilization devices is a hot water storage device having a tank that stores hot water, and the hot water storage device heats the hot water inside of the tank using heat held by the heat medium, a second heat utilization device among the plurality of heat utilization devices is an indoor heating device that performs indoor heating using heat held by the heat medium, a first heat source device among the plurality of heat source devices is a combined heat and power supply device that generates both heat and electricity, a second heat source device among the plurality of heat source devices is a boiler device that heats the heat medium with combustion heat generated by burning a fuel, the heat supply system comprising:

a heat medium return path where the heat medium at a relatively low temperature after heat has been used by each of the hot water storage device and the indoor heating device is caused to merge, and where that heat medium is supplied in parallel to each of the combined heat and power supply device and the boiler device; a heat medium outward path where the heat medium at a relatively high temperature after being heated by each of the combined heat and power supply device and the boiler device is caused to merge, and where that heat medium is supplied in parallel to each of the hot water storage device and the indoor heating device; a flow state adjustment device that adjusts a flow state of the heat medium in the heat medium return path and the heat medium outward path; and a control device that controls operation of the plurality of heat source devices and the flow state adjustment device;

a heat exchange unit is provided inside of the tank of the hot water storage device, and by the heat exchange unit exchanging heat between the hot water stored in the tank and the heat medium, the temperature of the hot water being stored inside of the tank is increased, a hot water discharge path that allows the hot water being stored inside of the tank of the hot water storage device to flow out of the tank is connected to an upper portion of the tank, and a water supply path that allows water to be replenished according to the outflow of the hot water from the hot water discharge path to flow into the tank of the hot water storage device is connected to a lower portion of the tank, a temperature detection unit that detects the temperature of hot water being stored inside of the tank is provided, when a first temperature of the hot water detected by the temperature detection unit is a first lower limit temperature or less, where a temperature increase operation by the combined heat and power supply device is permitted, the control device operates the combined heat and power supply device, and operates the flow state adjustment device such that the heat medium circulates between the combined heat and power supply device and the hot water storage device through the heat medium return path and the heat medium outward path, when a second temperature of the hot water detected by the temperature detection unit is a second lower limit temperature or less, where a temperature increase operation by the boiler device is permitted, the control device operates the boiler device, and operates the flow state adjustment device such that the heat medium circulates between the boiler device and the hot water storage device through the heat medium return path and the heat medium outward path, and the first lower limit temperature is a temperature higher than the second lower limit temperature.

* * * * *